(12) United States Patent
Abe (10) Patent No.: US 9,669,808 B2
(45) Date of Patent: Jun. 6, 2017

(54) VEHICLE ENGINE BRAKE CONTROL APPARATUS

(75) Inventor: Kyoichi Abe, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/980,397

(22) PCT Filed: Jan. 21, 2011

(86) PCT No.: PCT/JP2011/051110
§ 371 (c)(1),
(2), (4) Date: Jul. 18, 2013

(87) PCT Pub. No.: WO2012/098680
PCT Pub. Date: Jul. 26, 2012

(65) Prior Publication Data
US 2013/0304344 A1 Nov. 14, 2013

(51) Int. Cl.
| | |
|---|---|
| *B60T 8/17* | (2006.01) |
| *B60L 7/18* | (2006.01) |
| *B60L 7/26* | (2006.01) |
| *B60T 1/10* | (2006.01) |
| *B60W 10/08* | (2006.01) |
| *B60W 10/11* | (2012.01) |
| *B60W 10/188* | (2012.01) |

(Continued)

(52) U.S. Cl.
CPC *B60T 8/17* (2013.01); *B60L 7/18* (2013.01); *B60L 7/26* (2013.01); *B60L 15/2009* (2013.01); *B60T 1/10* (2013.01); *B60W 10/08* (2013.01); *B60W 10/11* (2013.01); *B60W 10/188* (2013.01); *B60W 30/18127* (2013.01); *B60W 30/18136* (2013.01); *B60T 2270/604* (2013.01); *B60W 2710/0644* (2013.01); *Y02T 10/645* (2013.01); *Y02T 10/72* (2013.01); *Y02T 10/7275* (2013.01)

(58) Field of Classification Search
CPC .......................... B60W 3/0162; B60W 30/165
USPC ...................................................... 701/22, 54
See application file for complete search history.

(56) References Cited

U.S. PATENT DOCUMENTS

| 5,527,231 A * | 6/1996 | Seidel et al. ................... 477/46 |
| 5,839,534 A * | 11/1998 | Chakraborty ...... B60K 31/0008 180/169 |
| 5,846,155 A * | 12/1998 | Taniguchi et al. ................ 477/2 |

(Continued)

FOREIGN PATENT DOCUMENTS

| JP | 2000110925 A | 4/2000 |
| JP | 2005-297814 A | 10/2005 |

(Continued)

*Primary Examiner* — Todd Melton
*Assistant Examiner* — Jason Roberson
(74) *Attorney, Agent, or Firm* — Andrews Kurth Kenyon LLP (57) ABSTRACT

An engine ECU and a brake ECU of a vehicle control apparatus performs any one of a mechanical brake which converts a kinetic energy using rotation of a driving wheel rotation into thermal energy using friction and a regeneration brake which converts the kinetic energy of the driving wheel rotation into electric energy using regeneration, during a vehicle deceleration, after an engine brake changes a deceleration ratio which is a rotation number ratio of driving wheels with respect to the rotation number of an engine.

3 Claims, 7 Drawing Sheets

(51) Int. Cl.
*B60W 30/18* (2012.01)
*B60L 15/20* (2006.01)

(56) References Cited

U.S. PATENT DOCUMENTS

| | | | | |
|---|---|---|---|---|
| 6,126,251 | A * | 10/2000 | Yoshii et al. | 303/152 |
| 6,334,498 | B1 * | 1/2002 | Morisawa et al. | 180/65.25 |
| 6,554,088 | B2 * | 4/2003 | Severinsky et al. | 180/65.23 |
| 6,809,429 | B1 * | 10/2004 | Frank | 290/40 C |
| 7,104,347 | B2 * | 9/2006 | Severinsky et al. | 180/65.23 |
| 8,052,569 | B2 * | 11/2011 | Tabata et al. | 477/3 |
| 8,396,618 | B2 * | 3/2013 | Cikanek et al. | 701/22 |
| 2001/0023666 | A1 * | 9/2001 | Suzuki | 123/2 |
| 2002/0023789 | A1 * | 2/2002 | Morisawa et al. | 180/65.2 |
| 2007/0096556 | A1 | 5/2007 | Kokubo et al. | |
| 2007/0222287 | A1 * | 9/2007 | Crombez et al. | 303/151 |
| 2009/0118885 | A1 * | 5/2009 | Heap et al. | 701/22 |
| 2009/0145673 | A1 * | 6/2009 | Soliman et al. | 180/65.1 |
| 2009/0228184 | A1 * | 9/2009 | Ueyama et al. | 701/96 |
| 2010/0204896 | A1 * | 8/2010 | Biondo et al. | 701/93 |
| 2011/0125351 | A1 * | 5/2011 | Bauerle | 701/22 |
| 2012/0031692 | A1 * | 2/2012 | Koike | 180/65.25 |
| 2012/0109432 | A1 * | 5/2012 | Pitsch et al. | 701/22 |
| 2012/0130572 | A1 * | 5/2012 | Fedewa | 701/22 |
| 2014/0041179 | A1 * | 2/2014 | Bradley et al. | 29/401.1 |

FOREIGN PATENT DOCUMENTS

| | | |
|---|---|---|
| JP | 3858952 B2 | 12/2006 |
| JP | 2007-118791 A | 5/2007 |
| JP | 2007-204004 A | 8/2007 |
| JP | 2010158973 A | 7/2010 |

\* cited by examiner

VEHICLE ENGINE BRAKE CONTROL APPARATUS

CROSS REFERENCE TO RELATED APPLICATION

This is a national phase application based on the PCT International Patent Application No. PCT/JP2011/051110 filed on Jan. 21, 2011, the entire contents of which are incorporated herein by reference.

The present invention relates to a vehicle control apparatus, and particularly to a vehicle control apparatus that controls a deceleration of a vehicle.

BACKGROUND ART

A technology of an ACC (Adaptive Cruise Control) or the like is proposed which allows a host vehicle to perform a tracking travel in a predetermined distance between vehicles with respect to a preceding vehicle. For example, Patent Literature 1 discloses a vehicle travel control apparatus which controls a transmission of a vehicle transmission gear using a variable speed level or a speed change ratio for a relatively low speed, and thereby properly controlling a distance between the host vehicle and the preceding vehicle in front of the host vehicle. The travel control apparatus includes a preceding vehicle deceleration degree detection/estimation unit which detects or estimates a deceleration degree of the preceding vehicle, and a variable speed level/speed change ratio selection unit which selects the variable speed level or the speed change ratio of the transmission gear during a transmission control, based on the deceleration degree of the preceding vehicle.

CITATION LIST

Patent Literature

[Patent Literature 1] Japanese Unexamined Patent Application Publication No. 2005-297814

SUMMARY OF INVENTION

Technical Problem

However, in the above technology, it is possible to decrease a load of adjusting a distance between vehicles by a driver's brake operation or accelerator operation, but causes an insufficient deceleration degree problems in tracking with a desired deceleration degree or the like. Therefore, improvements are desired.

The present invention is to provide a vehicle control apparatus which can decrease a cost by preventing a mechanical brake or a regeneration brake from being exhausted, while improving the tacking with the desired deceleration degree.

Solution to Problem

The present invention is a vehicle control apparatus including a deceleration control unit that performs any one of a mechanical brake which converts a kinetic energy of a driving wheel rotation into a thermal energy using friction and a regeneration brake which converts the kinetic energy of the driving wheel rotation into an electric energy using regeneration, during a vehicle deceleration, after an engine brake changes a deceleration ratio which is a rotation number ratio of driving wheels with respect to the rotation number of a driving source.

According to this configuration, the deceleration control unit performs any one of the mechanical brake which converts the kinetic energy of the driving wheel rotation into the thermal energy using the friction, and the regeneration brake which converts the kinetic energy of the driving wheel rotation into the electric energy using the regeneration during the vehicle deceleration, after the engine brake changes the deceleration ratio which is the engine rotation number ratio of the driving wheel with respect to the rotation number of the driving source. Therefore, it is possible to decrease a cost by preventing the mechanical brake or the regeneration brake from being exhausted, while tacking is improved with a desired deceleration degree.

In this case, the deceleration control unit performs any one of the mechanical brake and the regeneration brake, during the engine brake, under a condition that the rotation number of the driving source reaches an allowable upper limit rotation number.

According to this configuration, the deceleration control unit performs any one of the mechanical brake and the regeneration brake during the engine brake, under the condition that the rotation number of the driving source reaches the allowable upper limit rotation number. Therefore, the noises due to the engine brake are suppressed within an allowable limit, and the cost can be decreased by preventing the mechanical brake or the regeneration brake from being exhausted.

In this case, the deceleration control unit continues the engine brake without performing the mechanical brake and the regeneration brake, during the engine brake, after the rotation number of the driving source reaches the upper limit rotation number, and thereafter performs any one of the mechanical brake and the regeneration brake.

According to this configuration, the deceleration control unit continues the engine brake without performing the mechanical brake or the regeneration brake, during the engine brake, after the rotation number of the driving source reaches the upper limit rotation number, and thereafter performs any one of the mechanical brake and the regeneration brake. Therefore, the noises due to the engine brake is suppressed, the time used for the engine brake or the regeneration brake is further reduced, and thereby the mechanical brake or the regeneration brake can be further prevented from being exhausted.

In this case, it is preferable that the deceleration control unit maintains the deceleration ratio and continues the engine brake, during the engine brake, after the rotation number of the driving source reaches the upper limit rotation number.

According to this configuration, the deceleration control unit maintains the deceleration ratio and continues the engine brake, during the engine brake, after the rotation number of the driving source reaches the upper limit rotation number. Therefore, after the rotation number of the driving source reaches the upper limit rotation number, without performing the mechanical brake and the regeneration brake, the rotation number of the driving source stays near the allowable upper limit rotation number even within a time to continue the engine brake, and the noises due to the engine brake can be further suppressed.

In addition, the deceleration control unit performs the engine brake so that the rotation number of the driving source is within the upper limit rotation number depending on a required deceleration degree, and performs any one of the mechanical brake and the regeneration brake, in a case where the deceleration degree obtained by the engine brake when the rotation number of the driving source is the upper limit rotation number is insufficient compared to the required deceleration degree.

According to this configuration, since the deceleration control unit performs the engine brake so that the rotation number of the driving source may be within the upper limit rotation number depending on a required deceleration degree, the required deceleration can be obtained, the noises due to the engine brake can be suppressed within the allowable limit while obtaining the required deceleration degree. In addition, in a case where the deceleration degree obtained by the engine brake when the rotation number of driving source is the upper limit rotation number is insufficient compared to the required deceleration degree, the deceleration control unit performs any one of the mechanical brake and the regeneration brake. Therefore, the noises due to the engine brake are suppressed within the allowable limit, the time used for the mechanical brake or the regeneration brake is reduced, and thereby the required deceleration degree can be obtained.

In addition, the deceleration control unit controls the deceleration degree so that variations in a change rate of the deceleration degree per unit time are within a predetermined value, when any one of the mechanical brake and the regeneration brake is performed from the engine brake.

According to this configuration, when any one of the mechanical brake and the regeneration brake is performed from the engine brake, the deceleration control unit controls the deceleration so that variations in the deceleration change rate of the deceleration degree per unit time may be decreased within a predetermined value. Therefore, the deceleration change is smoothly performed at the time of switching the mechanical brake or the regeneration brake from the engine brake, and thereby a comfort able feeling of occupants can be improved.

In addition, the deceleration control unit is able to change the speed change ratio with a continuously variable stage.

According to this configuration, the deceleration control unit can change the speed change ratio with the continuously variable stage, and thereby more efficient engine brake can be performed.

Advantageous Effects of Invention

According to a vehicle control apparatus of the present invention, it is possible to decrease a cost by preventing the mechanical brake or the regeneration brake from being exhausted, while tacking is improved with a desired deceleration degree.

DESCRIPTION OF EMBODIMENTS

Figure 1:
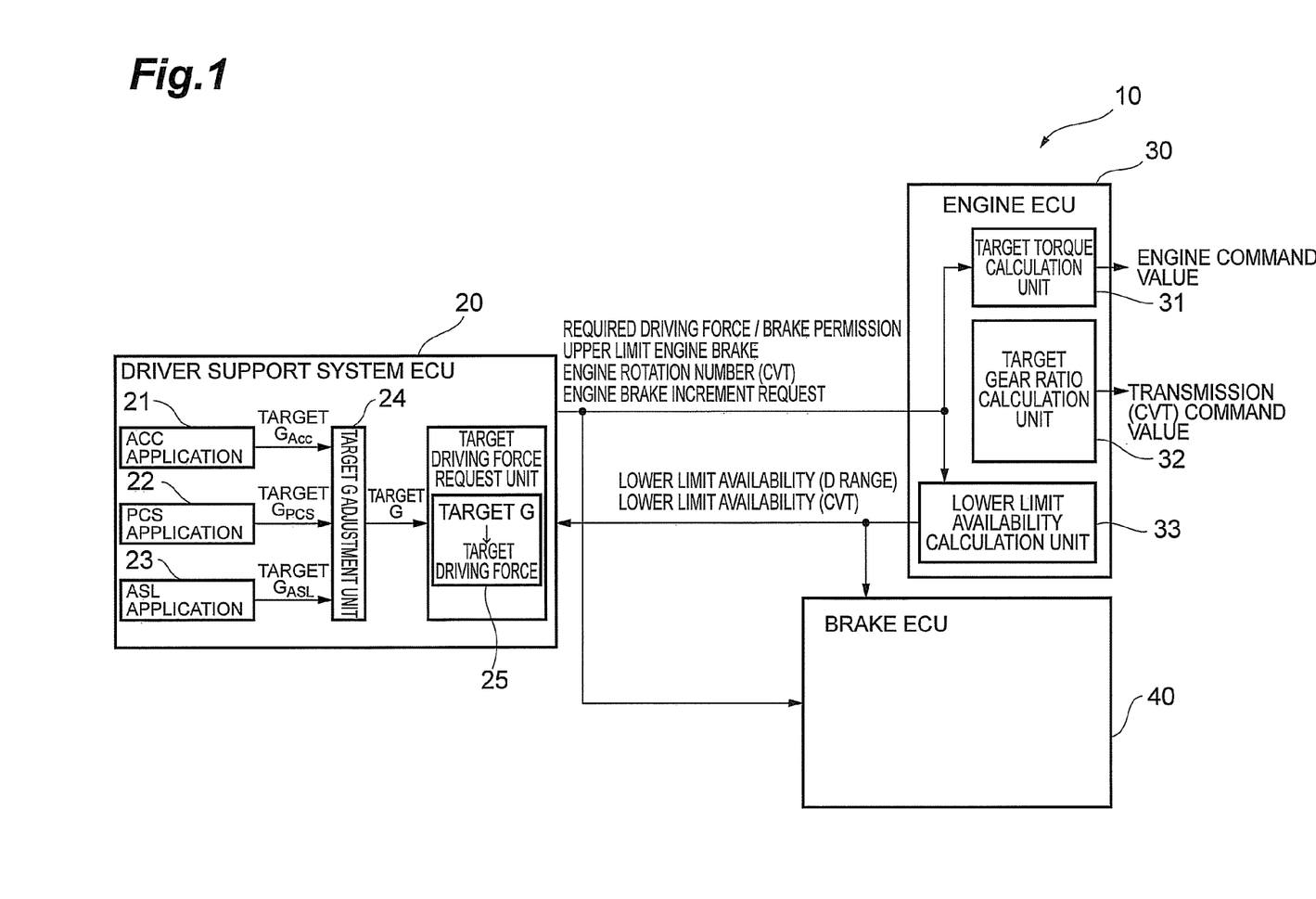
FIG. 1 is a block diagram illustrating a configuration of a vehicle control apparatus according to an embodiment.

Hereinafter, a vehicle control apparatus according to an embodiment of the present invention will be described with reference to drawings. As illustrated in FIG. 1, the vehicle control apparatus 10 according to the present embodiment includes a driver support system ECU 20, an engine ECU 30, and a brake ECU 40. The vehicle control apparatus 10 of the present embodiment performs a deceleration control in an ACC or the like, in a vehicle with a continuously variable transmission (CVT).

The driver support system ECU 20 includes an application program which supports a driver's driving operation such as an ACC application 21 which allows a host vehicle to perform a tracking travel in a predetermined distance with respect to a preceding vehicle, a PCS (Pre-Crash Safety) application 22 which aims to reduce a collision damage by detecting vehicles or obstacles on a travelling path, and an ASL (Auto Speed Limit) application 23 which controls a vehicle not to exceed a predetermined upper limit vehicle speed.

Targets $G_{ACC}$, $G_{PCS}$, and $G_{ASL}$ which are an acceleration degree or a deceleration degree required by the ACC application 21, the PCS application 22 and the ASL application 23, respectively are adjusted as a target G to the engine ECU 30 by a target G adjustment unit 24. In addition, the ACC application 21 and the ASL application 23 output the targets $G_{ACC}$ and $G_{ASL}$, respectively, and additionally output a command signal with regard to an engine brake increment request. This is because there is a situation where it is desirable to use the engine brake or a situation where it is undesirable to use the engine brake. When the engine brake increment request is ON, the engine brake (hereinafter, occasionally referred to as a CVT engine brake) is performed by changing speed change ratio of the continuously variable transmission. However, when the engine brake increment request is OFF, the CVT engine brake is not performed, and only a deceleration (hereinafter, occasionally referred to as a D range engine brake) causing a throttle to be OFF at the speed change ratio (D range) during a normal travel is performed. In addition, the ACC application 21 and the ASL application 23 output the upper limit engine rotation number during the CVT engine brake. In addition, the ACC application 21 and the ASL application 23 transmit the command signal with regard to a (mechanical) brake permission which indicates whether use of the mechanical brake such as a disk brake of the vehicle and a drum brake of the vehicle is permissible or not.

In a target driving force request unit 25, the target G is feedback-controlled so as to match the target G and an actual vehicle G, and converted into a target driving force (a required driving force) which compensates disturbance affection. As described above, the command signal with regard to the required driving force and whether there is the brake permission or not, the upper limit engine rotation number during the CVT engine brake, and an engine brake volume increment request command signal as the case may be are transmitted from the driver support system ECU 20 to the engine ECU 30 and the brake ECU 40. The driver support system ECU 20 does not perform a speed change ratio control or the like, and outputs only the upper limit engine rotation number or the required driving force.

The engine ECU 30 calculates an engine output in a target torque calculation unit 31 and outputs an engine command value to the engine, according to the required driving force or the upper limit engine rotation number from the driver support system ECU 20.

In addition, the engine ECU 30 calculates a target gear ratio of the continuously variable transmission in a target gear ratio calculation unit 32 as will be described later, and outputs a transmission command value to the continuously variable transmission, according to the required driving force or the upper limit engine rotation number from the driver support system ECU 20.

The required driving force is transmitted from the ACC application 21 of the driver support system ECU 20 or the like. In the engine ECU 30, the throttle control is performed so as to achieve the required driving force, and the throttle is fully closed when the deceleration is necessary. When the deceleration is necessary more than that, the speed change ratio of the continuously variable transmission is increased, the engine rotation number is increased, and a friction loss of the engine is increased, and thereby the deceleration degree is available. However, when the engine rotation number is increased too much, the noises are increased. Therefore, the engine ECU 30 performs the control within the upper limit engine rotation number transmitted from the ACC application 21 of the driver support system ECU 20 or the like.

In addition, the engine ECU 30 calculates the sum of a friction torque obtained by the engine brake (the D range engine brake and the CVT engine brake) in the upper limit engine rotation number as will be described later, and an auxiliary apparatus torque obtained by the auxiliary apparatus when the vehicle is an electric vehicle, based on the upper limit engine rotation number from the driver support system ECU 20.

A lower limit availability (D range) which is a minimum driving force (deceleration degree) obtained by the D range engine brake, and an lower limit availability (CVT) which is the minimum driving force (deceleration degree) obtained by the CVT engine brake are transmitted to the driver support system ECU 20 and the brake ECU 40. The driver support system ECU 20 performs the feedback control with regard to the target driving force, the engine brake permission command, or the engine brake increment request, according to the lower limit availability (D range) and the lower limit availability (CVT).

The brake ECU 40 determines whether or not the required driving force (deceleration degree) can be achieved by the engine brake only, based on the lower limit availability (D range) and the lower limit availability (CVT). In a case where the required driving force (deceleration degree) cannot be achieved by the engine brake only, when the brake permission command is ON, the brake ECU 40 performs the deceleration by operating the mechanical brake or the regeneration brake as much as necessary.

The usage of the mechanical brake or the regeneration brake is changed depending on whether or not the CVT engine brake is performed in the engine ECU 30 side. If the engine brake increment request is OFF from the driver support system ECU 20, the brake ECU 40 generates the driving force (deceleration degree) as much as the required driving force and the lower limit availability (D range), using the mechanical brake or the regeneration brake. On the other hand, when the engine brake increment request is ON from the driver support system ECU 20, since the driving force due to the mechanical brake or the regeneration brake is excessive as it is, the brake ECU 40 generates the driving force (CVT) as much as the required driving force minus the lower limit availability (D range), using the mechanical brake or the regeneration brake.

Figure 2:
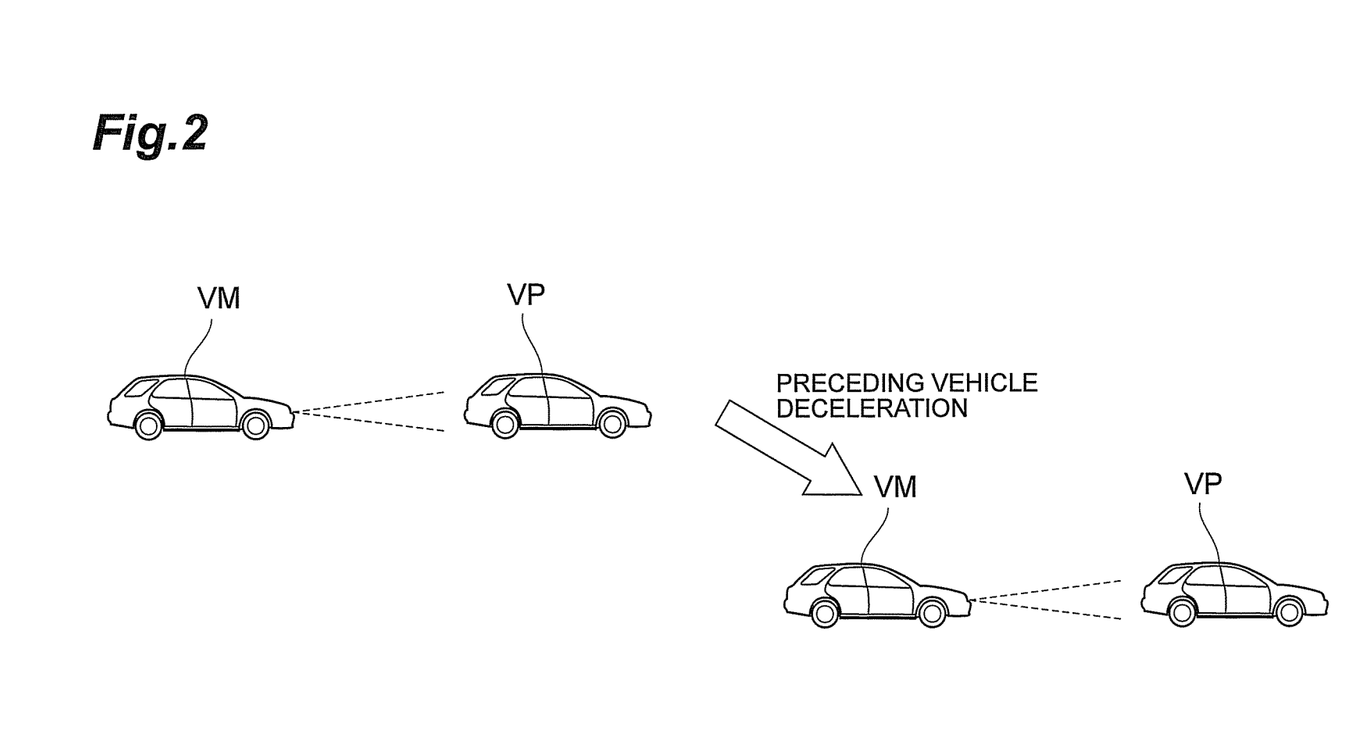
FIG. 2 is a view illustrating a situation when a preceding vehicle decelerates.
Figure 3:
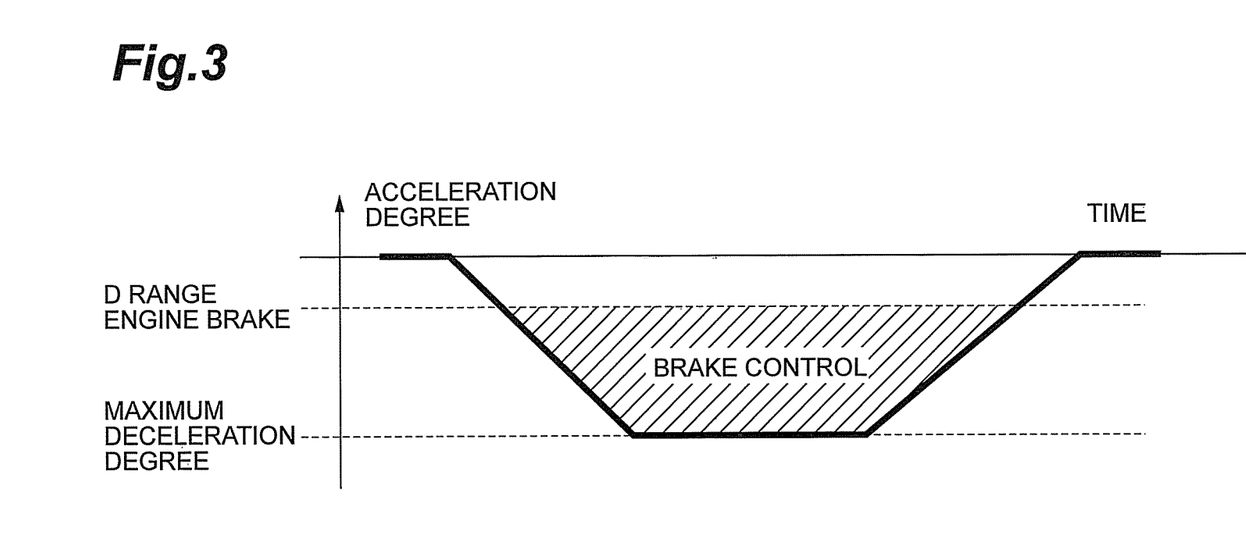
FIG. 3 is a block diagram illustrating a deceleration degree control without using a conventional CVT engine brake.

Hereinafter, the tracking travel by the vehicle control apparatus 10 of the present embodiment will be described. As illustrated in FIG. 2, when a host vehicle VM performs the tracking travel with respect to the preceding vehicle VP according to the ACC application 21, a situation is assumed in which the preceding vehicle VP followed by the host vehicle VM decelerates. At this time, when the engine brake increment request is OFF from the driver support system ECU 20, as illustrated in FIG. 3, only the D range engine brake is performed, and when the required driving force cannot be achieved by the D range engine brake, the deceleration using the mechanical brake or the regeneration brake is performed. In this case, the usage of the mechanical brake or the like is increased.

Figure 4:
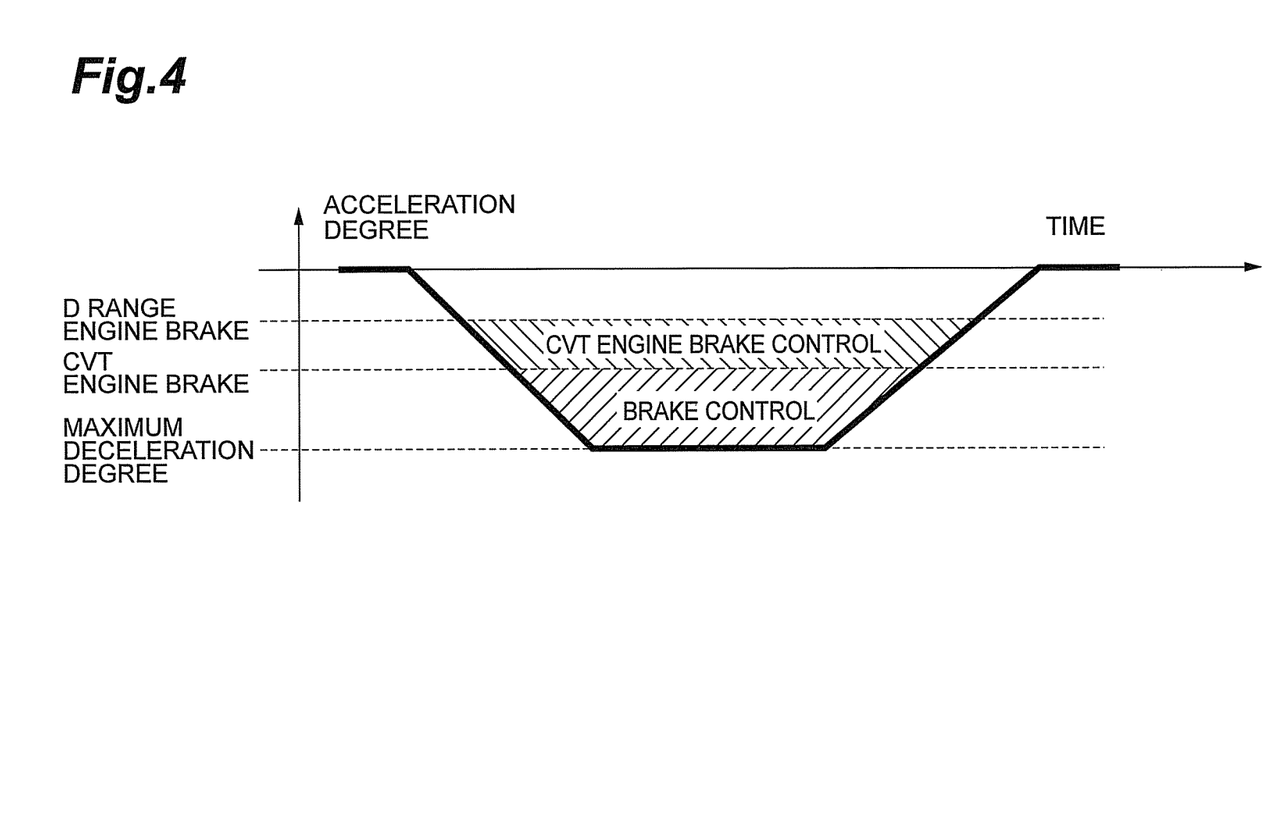
FIG. 4 is a block diagram illustrating a deceleration degree control using a CVT engine brake according to the present embodiment.

On the other hand, in a case where the engine brake increment request is ON from the driver support system ECU 20, when the deceleration degree or the like is not changed, as illustrated in FIG. 4, the CVT engine brake is performed after the D range engine brake, and the engine rotation number reaches the upper limit engine rotation number, and when the required driving force cannot be achieved by the CVT engine brake, the deceleration is performed by the mechanical brake or the regeneration brake. In this case, the usage of the mechanical brake or the like is decreased. In addition, a difference among a deceleration degree change rate in the D range engine brake, a deceleration degree change rate in the CVT engine brake, and a deceleration degree change rate in the mechanical brake is within a predetermined value. The inclination of the deceleration degree is smoothly continued during the deceleration using each method in the drawings.

Figure 5:
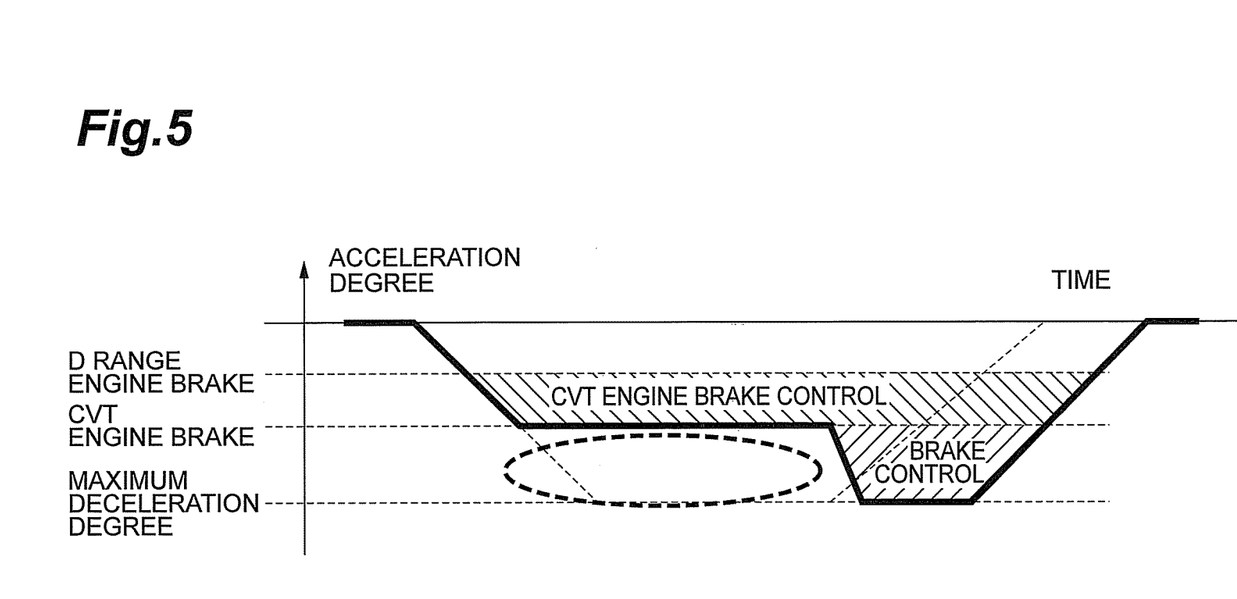
FIG. 5 is a block diagram illustrating a deceleration degree control which causes delayed start of a brake control in FIG. 4.

Furthermore, when there is a request, for example to suppress the usage of the mechanical brake or the like, as illustrated in FIG. 5, the CVT engine brake is performed after the D range engine brake, and the engine rotation number reaches the upper limit engine rotation number, even after the required driving force by the CVT engine brake cannot be achieved, the CVT engine brake is continued depending on situations, and starting to use the mechanical brake is delayed. In this case, it is possible to significantly reduce the usage of the mechanical brake, but in a portion indicated by a dashed oval in the drawings, the host vehicle VM approaches the preceding vehicle VP. Therefore, in the present embodiment, it is possible to determine a decelerating method depending on which degree is allowable for noises due to the increment of the engine rotation number and approach to the preceding vehicle VP. If it is determined that there is a possibility where the host vehicle VM may come into contact with the preceding vehicle VP, the mechanical brake is immediately used. On the other hand, when the required driving force can be achieved without using the mechanical brake or the regeneration brake, the mechanical brake and the regeneration brake are not used.

Figure 6:
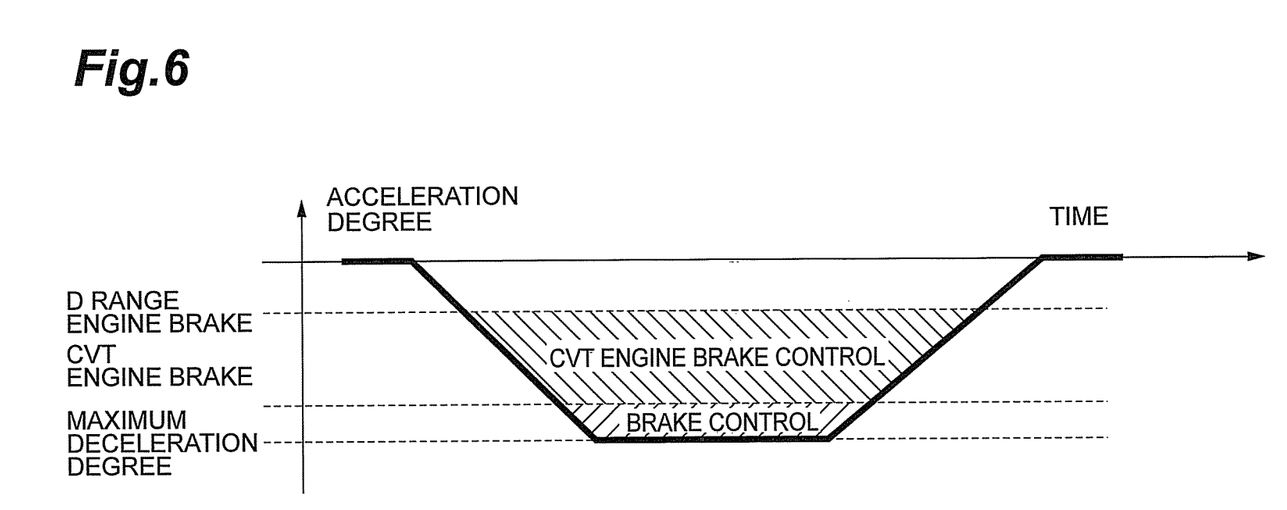
FIG. 6 is a block diagram illustrating a deceleration degree control using a CVT engine brake until the engine rotation number becomes greater in FIG. 4.

In a case where the driver wants to decrease the usage of the mechanical brake or the like without changing the deceleration degree or the like, as illustrated in FIG. 6, the upper limit engine rotation number is further increased, the CVT engine brake is performed even in the portion where the deceleration is performed by the mechanical brake or the like in FIG. 4. Thus, the usage of the mechanical brake or the like is decreased, but the upper limit engine rotation number is increased, and thereby an engine sound becomes louder.

Therefore, in the present embodiment, it is possible to perform the deceleration in a balanced state between the noises and the mechanical brake uses.

Figure 7:
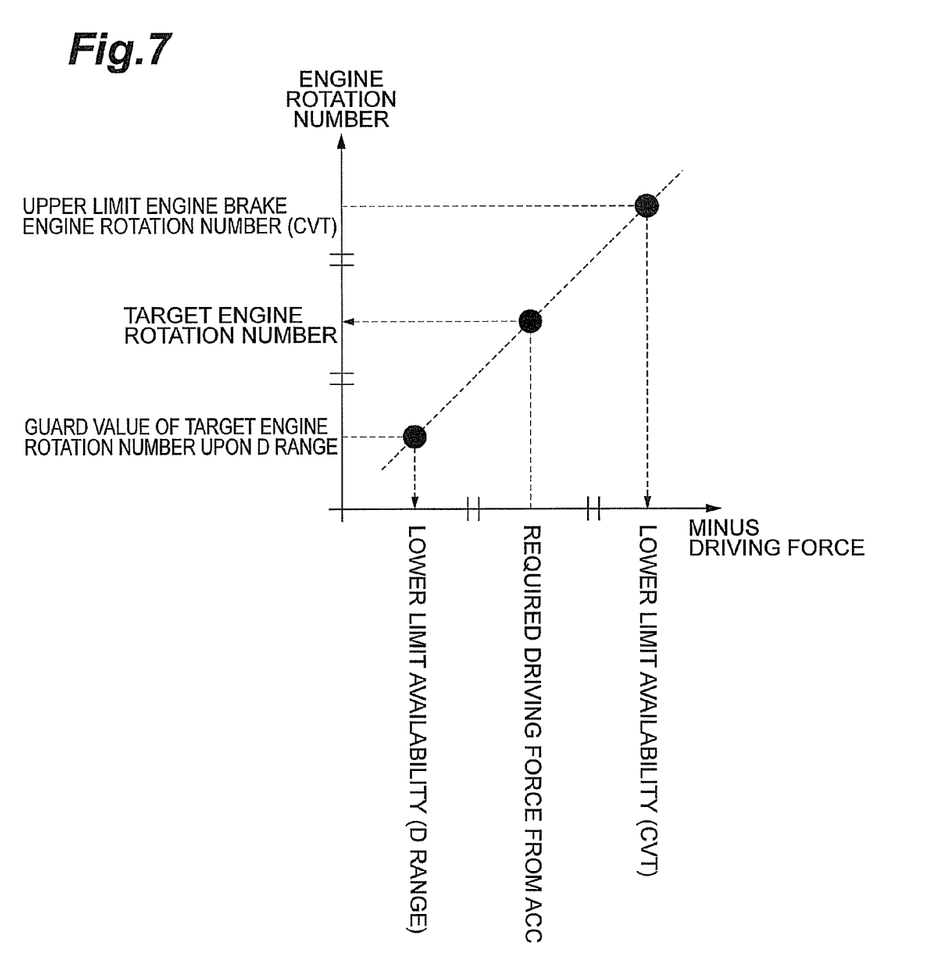
FIG. 7 is a block diagram illustrating a relationship between the engine rotation number and a required deceleration degree (a minus driving force).

In addition, a method of determining the speed change ratio of the continuously variable transmission with respect to the required driving force in the engine ECU 30 will be described. Here, as illustrated in FIG. 7, it is assumed that the engine rotation number in the lower limit availability (D range) and the upper limit engine rotation number in the lower limit availability (CVT) can be obtained. The lower limit availability (D range) is the minimum driving force output by the D range of the transmission gear, and can be calculated from the auxiliary apparatus torque and the engine friction torque at the time of the minimum engine rotation number. In addition, the lower limit availability (CVT) is the minimum driving force output when the engine rotation number is increased by the CVT engine brake, and can be calculated from the auxiliary apparatus torque and the engine friction torque at the time of an assigned upper limit engine rotation number.

If the required driving force from the ACC application 21 is greater than the lower limit availability (D range) (the deceleration degree is low), the engine ECU 30 performs a control to increase a throttle opening degree. When the required driving force is equal to the lower limit availability (D range), the engine ECU 30 fully closes the throttle.

Here, when the required driving force from the ACC application 21 is smaller than the lower limit availability (D range) (the deceleration degree is high), the engine ECU 30 assumes that characteristics of the engine rotation number with respect to the engine driving force are linear shape. For example, if the required driving force from the ACC application 21 is an intermediate value between the lower limit availability (D range) and the lower limit availability (CVT), the target engine rotation number conforming to the required driving force can be assumed to be the intermediate value between the engine rotation number in the lower limit availability (D range) and the upper limit engine rotation number of the CVT engine brake.

As a result, a cost for calculation can be reduced. The speed change ratio of the continuously variable transmission can be determined from the target engine rotation number. If the required driving force is smaller than the lower limit availability (CVT) (the deceleration degree is high), the engine ECU 30 determines the speed change ratio so as to be the upper limit engine rotation number. In the present embodiment, in the engine ECU 30 side, the speed change ratio of the continuously variable transmission is operated to obtain a desired deceleration degree is obtained, and thus, the more efficient control can be performed than the case of calculating that the speed change ratio or the like in the ACC application side.

According to the present embodiment, the engine ECU 30 and the brake ECU 40 of the vehicle control apparatus 10 perform any one of a mechanical brake which converts a kinetic energy of a driving wheel rotation into a thermal energy using friction and a regeneration brake which converts the kinetic energy of the driving wheel rotation into an electric energy using regeneration, during a vehicle deceleration, after an engine brake changes a deceleration ratio which is a rotation number ratio of driving wheels with respect to the rotation number of the engine. Therefore, it is possible to decrease a cost by preventing the mechanical brake or the regeneration brake from being exhausted, while the tacking is improved with a desired deceleration degree. In addition, a gas mileage can be improved by increasing the deceleration using the engine brake reserving the kinetic energy by means of a piston movement.

In addition, according to the present embodiment, the engine ECU 30 and the brake ECU 40 performs any one of the mechanical brake and the regeneration brake, during the engine brake, under a condition that the rotation number of the driving source reaches an allowable upper limit rotation number. Therefore, the noises due to the engine brake are suppressed within an allowable limit, and the cost can be reduced by preventing the mechanical brake or the regeneration brake from being exhausted.

In addition, according to the present embodiment, the engine ECU 30 and the brake ECU 40 continues the engine brake without performing the mechanical brake and the regeneration brake, during the engine brake, after the rotation number of the driving source reaches the upper limit rotation number, and thereafter performs any one of the mechanical brake and the regeneration brake. Therefore, the noises due to the engine brake are suppressed, and the time to use the engine brake or the regeneration brake is further reduced, and thereby the exhaustion of the mechanical brake or the regeneration brake can be further prevented.

In addition, according to the present embodiment, the engine ECU 30 and the brake ECU 40 maintains the deceleration ratio and continues the engine brake, during the engine brake, after the rotation number of the driving source reaches the upper limit rotation number. Therefore, the engine rotation number remains near the allowable upper limit rotation number within a predetermined period of time, and the noises due to the engine brake can be further suppressed.

In addition, according to the present embodiment, the engine ECU 30 performs the engine brake so that the rotation number of the driving source is within the upper limit rotation number depending on a required deceleration degree, thereby the required deceleration degree can be obtained, and the noises due to the engine brake can be suppressed within the allowable limit. In addition, when the deceleration obtained by the engine brake is insufficient compared to the required deceleration in a case where the engine rotation number is the upper limit engine rotation number, the brake ECU 40 performs any one of the mechanical brake and the regeneration brake, and thus the noises due to the engine brake is suppressed within the allowable limit, the time to use the mechanical brake or the regeneration brake is reduced, and thereby the required deceleration degree can be obtained.

In addition, according to the present embodiment, the engine ECU 30 and the brake ECU 40 controls the deceleration degree so that variations in a change rate of the deceleration degree per unit time are within a predetermined value, when any one of the mechanical brake and the regeneration brake is performed from the engine brake. Therefore, the deceleration degree change is smoothly performed during the switching of the mechanical brake or the regeneration brake from the engine brake, and thereby a comfortable feeling of occupants can be improved.

In addition, according to the present embodiment, the engine ECU 30 is able to change the speed change ratio with a continuously variable stage, and thereby more efficient engine brake can be performed.

Hitherto, embodiments of the present invention are described, but the present invention is not limited to the embodiments, and various modifications can be made.

INDUSTRIAL APPLICABILITY

According to the vehicle control apparatus of the present invention, it is possible to decrease a cost by preventing the mechanical brake or the regeneration brake from being exhausted, while tacking is improved with a desired deceleration degree.

REFERENCE SIGNS LIST 10 vehicle control apparatus
20 driver support system ECU
21 ACC application
22 PCS application
23 ASL application
24 target G adjustment unit
25 target driving force request unit
30 engine ECU
31 target torque calculation unit
32 target gear ratio calculation unit
33 lower limit availability calculation unit
40 brake ECU

The invention claimed is:

1. A vehicle control apparatus comprising:
 a driver support system ECU including an application program which supports a driver's driving operation, and outputting a required driving force corresponding to a deceleration degree required by the application program and an allowable upper limit rotation number in the rotation number of the driving source,
 an engine ECU performing an engine brake changing a deceleration ratio, which is a rotation number ratio of driving wheels with respect to the rotation of a driving source according to the required driving force and the upper limit rotation number output by the driver support system ECU,
 a brake ECU performing any one of a mechanical brake, which converts a kinetic energy of a driving wheel rotation into a thermal energy using friction, and a regeneration brake, which converts the kinetic energy of the driving wheel rotation into an electric energy using regeneration, during a vehicle deceleration of a vehicle, in conjunction with the engine brake,
 wherein the engine ECU can change the deceleration ratio with a continuously variable stage, and assumes that characteristics of the rotation number of the driving source with respect to a deceleration degree are linear shape, and determines the deceleration ratio from a target rotation number of the driving source, and performs the engine brake according to the required driving force output by the driver support system ECU by a target rotation number equal to or lower than the upper limit rotation number,
 wherein the brake ECU, compensates for an insufficient deceleration degree by performing at least one of the mechanical brake and the regeneration brake in conjunction with the engine brake, when the deceleration degree by the engine brake is insufficient compared to the deceleration degree according to the required driving force, and
 wherein the brake ECU during the engine brake, continues the engine brake without performing the mechanical brake and the regeneration brake, after the rotation number of the driving source reaches the upper limit rotation number, and thereafter performs any one of the mechanical brake and the regeneration brake.

2. The vehicle control apparatus of claim 1,
 wherein the engine ECU maintains the deceleration ratio while continuing the engine brake, during the engine brake, after the rotation number of the driving source reaches the upper limit rotation number.

3. The vehicle control apparatus according to claim 1,
 wherein the brake ECU and the brake ECU control the deceleration degree so that variations in a rate change of the deceleration degree are within a predetermined value.

* * * * *